(12) United States Patent
Ferro

(10) Patent No.: US 8,143,810 B2
(45) Date of Patent: Mar. 27, 2012

(54) DRIVE DEVICE FOR LEDS AND RELATED METHOD

(75) Inventor: Alberto Ferro, Preganziol (IT)

(73) Assignee: Osram AG, Munich (DE)

( * ) Notice: Subject to any disclaimer, the term of this patent is extended or adjusted under 35 U.S.C. 154(b) by 479 days.

(21) Appl. No.: 12/226,886

(22) PCT Filed: Jun. 4, 2007

(86) PCT No.: PCT/EP2007/055481
§ 371 (c)(1),
(2), (4) Date: Nov. 19, 2008

(87) PCT Pub. No.: WO2007/147724
PCT Pub. Date: Dec. 27, 2007

(65) Prior Publication Data
US 2009/0184665 A1 Jul. 23, 2009

(30) Foreign Application Priority Data

Jun. 22, 2006 (EP) .................................... 06425425

(51) Int. Cl.
*H05B 37/02* (2006.01)
(52) U.S. Cl. ................ 315/297; 315/209 R; 315/224; 315/291; 315/307; 315/308; 363/101; 363/21.01; 363/21.12; 363/21.15; 363/21.17
(58) Field of Classification Search ................ 315/219, 315/224, 225, 246, 247, 291, 294, 297, 307, 315/308, 209 R; 363/21.01, 21.12, 21.15, 363/21.16, 21.17, 21.18, 101
See application file for complete search history.

(56) References Cited

U.S. PATENT DOCUMENTS 5,475,579 A * 12/1995 John et al. .................. 363/21.07
(Continued)

FOREIGN PATENT DOCUMENTS

EP        1 372 359 A1     5/2003
(Continued)

OTHER PUBLICATIONS

C. Adragna: "L6565 Quasi-Resonant Controller", AN1326 Application Note, Nov. 2002, pp. 1-34, XP002407906, whole document.
(Continued)

*Primary Examiner* — Douglas W Owens
*Assistant Examiner* — Thai Pham
(74) *Attorney, Agent, or Firm* — Holtz, Holtz, Goodman & Chick, PC

(57) ABSTRACT

A LED driver arrangement including a switching-mode stage to produce a drive current for feeding a LED from a DC input; a current sensor for the current fed to the LED for producing a feedback signal; error amplifier circuitry for generating a control signal from the feedback signal; and control circuitry sensitive to the control signal to control the switching-mode stage so that the drive current fed by the switching-mode stage to the LED corresponds to the LED current. An opto-coupler feeds the control signal to the control circuitry, and the opto-coupler having associated biasing circuitry to increase current on the opto-coupler when the LED current decreases. The opto-coupler is configured to saturate when the drive current reaches a minimum level. There is also an auxiliary supply voltage for the control circuitry to keep the auxiliary supply voltage above a minimum level when the opto-coupler is saturated.

11 Claims, 2 Drawing Sheets

U.S. PATENT DOCUMENTS

| | | | | |
|---|---|---|---|---|
| 5,747,982 | A | * | 5/1998 | Dromgoole et al. ........ 363/21.15 |
| 5,903,452 | A | * | 5/1999 | Yang .............................. 363/97 |
| 6,577,512 | B2 | * | 6/2003 | Tripathi et al. ............ 363/21.17 |
| 7,061,394 | B2 | | 6/2006 | Biebl et al. |
| 7,295,451 | B2 | * | 11/2007 | Charles ..................... 363/21.15 |
| 7,307,390 | B2 | * | 12/2007 | Huynh et al. ................. 315/291 |
| 7,906,917 | B2 | | 3/2011 | Tripathi |
| 2002/0018986 | A1 | | 2/2002 | DiCesare |
| 2003/0227265 | A1 | | 12/2003 | Biebl |
| 2004/0004446 | A1 | | 1/2004 | Liu et al. |

FOREIGN PATENT DOCUMENTS

| | | |
|---|---|---|
| JP | 2004-527138 A | 9/2004 |
| WO | WO 02/096162 A1 | 11/2002 |
| WO | WO 2006/046207 A1 | 5/2006 |

OTHER PUBLICATIONS

English Version of Japanses Office Action sent Aug. 24, 2011.

* cited by examiner

DRIVE DEVICE FOR LEDS AND RELATED METHOD

This application is a U.S. National Phase Application under 35 USC 371 of International Application PCT/EP2007/055481, filed Jun. 4, 2007, which is incorporated herein in its entirety by this reference.

FIELD OF THE INVENTION

The present invention relates to techniques for driving light emitting diodes (LEDs), especially as regards "dimming" the intensity/power of the radiation emitted therefrom.

The invention was developed with specific attention paid to its possible use in driving LEDs used as lighting sources (so-called high-flux LEDs).

DESCRIPTION OF THE RELATED ART

At present, two basic approaches exist for dimming the intensity of the light radiation emitted by a LED.

A first approach involves regulating the DC current through the LEDs. A second approach involves a pulse width modulation (PWM) of the load current, with a constant peak value. Sometimes the two approaches are combined in order to obtain better performance at low dimming levels.

The former approach is generally simpler to implement, especially if integrated in a low cost/compact power-supply; moreover, this approach can be resorted to also in order to adjust the DC current conformant to the maximum value admitted by the LED module, in order to guarantee the lifetime of the installation and avoid exceeding the rated current of the source. On the other hand, the latter approach, i.e. PWM modulation with a constant peak current, maintains the same wavelength of the light irrespective of the dimming level.

Nowadays, in order to reduce size and cost, most power-supplies for LEDs contain a certain number of switches that divert the current of one or more magnetic devices into two or more paths. This is the case of current non-resonant switch-mode-power-supply topologies, such as a buck, boost or buck-boost, or the related insulated topologies, connected to a constant voltage source. Typical switching frequencies are in the order of some tens of kilohertz.

Essentially, in order to reduce of a fixed amount the output light of a set of LEDs connected in series, the output current (and thus the output power) are decreased, while the output voltage is kept quite constant, because of the voltage-current characteristic of the LED junction. If the circuit works in CCM (Continuous-Conduction-Mode) and the input voltage is constant, the duty-cycle will remain essentially constant; in decreasing the output power, with a reasonably similar efficiency, the average current on the magnetic device will decrease until the circuit falls in DCM (Discontinuous-Conduction-Mode). At this level, the circuit could work in TM (Transition Mode), i.e. at the limit between DCM and CCM. In decreasing the output power, the switching frequency will be increased until a fixed level limited by designers in order to respect the EMI (electromagnetic interference) and efficiency constraints.

Exemplary of prior art controllers operating in TM mode are the controllers sold under the designations NCP1207 by ON-Semiconductor, TEA1507 or TEA1533 by Philips or L6565 by STMicroelectronics.

Therefore, at very low dimming levels, the circuit will operate in DCM. Most integrated controllers currently available on the market are unable to control in an accurate way the output power in these conditions, i.e. below a certain level, because they start to work in the so-called burst-mode. This means that, over a first part of the "burst" period, these controllers deliver a certain amount of power in excess and then, over a second part of the "burst" period, switching operation is discontinued in order to deliver a certain low average output power. This mode of operation is clearly unacceptable for LEDs, as it results in a low-frequency pulsating output power which causes a visible "flicker" in the light emitted from the source. Because of the logarithmic sensitivity of the human eye, this undesirable effect occurs when the apparent light intensity, however dimmed, is still rather high.

OBJECT AND SUMMARY OF THE INVENTION

The object of the present invention is thus to provide an effective solution to the problems described in the foregoing. A specific object of the invention is to keep the control circuitry on when the LED or LEDs are dimmed at very low DC current levels.

According to the present invention, that object is achieved by means of the arrangement having the features set forth in the claims that follow. The invention also relates to a corresponding method. The claims are an integral part of the disclosure of the invention provided herein.

A preferred embodiment of the invention takes the form of an improved non-resonant switch-mode-power-supply topology, as a buck, boost or buck-boost, or the related insulated topologies, connected to a constant voltage source, like a DC-link, usually comprised of a capacitor. This topology could take the form of a single-stage power-supply, or the form of the output stage of a multiple-stage power-supply.

A particularly preferred embodiment of the invention employs an arrangement to set the minimum auxiliary voltage above the UVLO (UnderVoltage LockOut) threshold comprised of two resistors and an optocoupler adapted to be saturated, plus an optional bleeder to reduce the LED current at low dimming levels.

The basic advantages provided by the invention are:
- a dimming capability of the LED power supply until zero current; and
- simplicity and compactness of the power supply.

BRIEF DESCRIPTION OF THE ANNEXED REPRESENTATIONS

The invention will now be described, by way of example only, by referring to the enclosed representations, wherein.

DETAILED DESCRIPTION OF THE INVENTION

Figure 1:
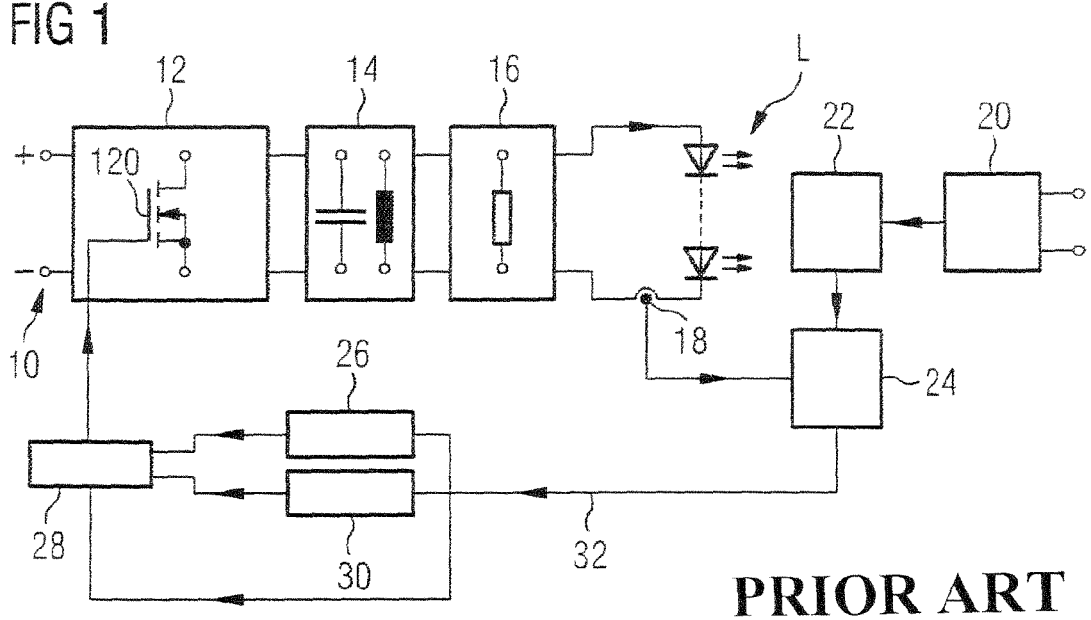
FIG. 1 is a general block diagram of a prior art LED controller arrangement.

The block diagram of FIG. 1 is generally representative of a single-stage constant-current power-supply or the final (output) stage of a multi-stage constant-current power-supply for one or more LEDs connected in series. Unless otherwise indicated, the general description of the basic arrangement of FIG. 1 will also apply to the improved arrangement of FIG. 2.

The circuit shown is provided with input terminals 10 intended to be connected in use to a constant voltage provided by a dc-link (not shown) comprised e.g. of an "upstream"

stage of the power-supply, another constant-voltage power-supply, a battery or a filtered rectifier connected to the mains voltage, and so on.

Starting from the dc-link terminals 10, a first module or block 12 includes a switching-mode final stage, based on one of these circuit topologies (including the related insulated topologies) able to provide such a function: buck, boost, buck-boost.

Reference numeral 14 denotes an output filter cascaded to the block 12 (in fact the filter 14 could be possibly included on the switching-mode final stage 12). A "bleeder" 16 (which is preferably an active bleeder rather than a simple resistor) is optionally provided in order to dissipate a certain amount of power at the output of the filter 14.

A current "sense" 18 (i.e. a current sensor of any known type) is associated to the LED or LEDs to sense the feed current provided thereto from the stage 12, typically through the filter 14 and the bleeder 16. The sensor 18 generates an electrical feedback signal proportional to the actual current fed to the LEDS. In the embodiment shown, the sensor 18 is connected directly in series with the LED or LEDs: however, those of skill in the art will promptly appreciate that the sensor 18 could be arranged at other locations in the circuit.

The circuit arrangement also includes a user interface 20 to convert dimming commands from a user into an electrical control signal. The user interface 20 can also be configured to provide all the electrical requirements requested by the standard protocol of the interface.

A variable reference generator 22 converts the electrical control signal from the interface 20 to produce a reference signal representative of the intensity of the current through the LED or LEDs requested by the user. An integrating error amplifier 24 compares the reference signal from the generator 22 with the actual output current sensed by the sensor 18, and generates an electrical control signal able to regulate the power fed to the LED or LEDs.

A CCM/DCM controller 26 generates a signal able to drive, via a logic circuitry 28, one or more electronic switches 120 included in the switching-mode final stage 12.

An oscillator 30 generates a fixed frequency signal, which is again able to drive, via the logic circuitry 28, the switch(es) 120 included in the switching-mode final stage 12.

Both the CCM/DCM controller 26 and the oscillator 30, as well as the logic circuitry 28 are sensitive to a control signal received over a line 32.

Specifically, the logic circuitry 28 determines, in accordance with the electrical control signal over the line 32, whether the switch or the switches of the switching-mode final stage 1 are to be driven according to the signal generated by the CCM/DCM controller 26 or according to the signal generated by the oscillator 30.

The output current supplied to the LED or LEDs L, as sensed by the sensor 18, is compared in the error amplifier 24 with a reference signal. This signal is provided by the reference generator 22 and is thus variable in compliance with the dimming level as requested by the user. The error amplifier 24 thus generates a control signal that is generally related to the amount of output power requested for the LED or LEDs.

If the dimming level is relatively high (so that the LED current is set in a higher range), the logic circuitry 28 drives the switch or switches 120 of the stage 12 according to the signal provided by the CCM/DCM controller 26, as in a normal closed-loop switch-mode power-supply. If the dimming level is relatively low so that the LED current is set in a lower range, the logic circuitry 28 drives the switch or switches 120 of the stage 12 according to the fixed frequency signal produced by the oscillator 30. In this way, even at low dimming levels, the circuit will work in DCM and not in burst-mode. As the switching frequency decreases, the output power delivered to the LED or LEDs will correspondingly decrease. With a switching frequency higher than about 100 Hz, the light of the LED or LEDs will not show any flicker.

Figure 3:
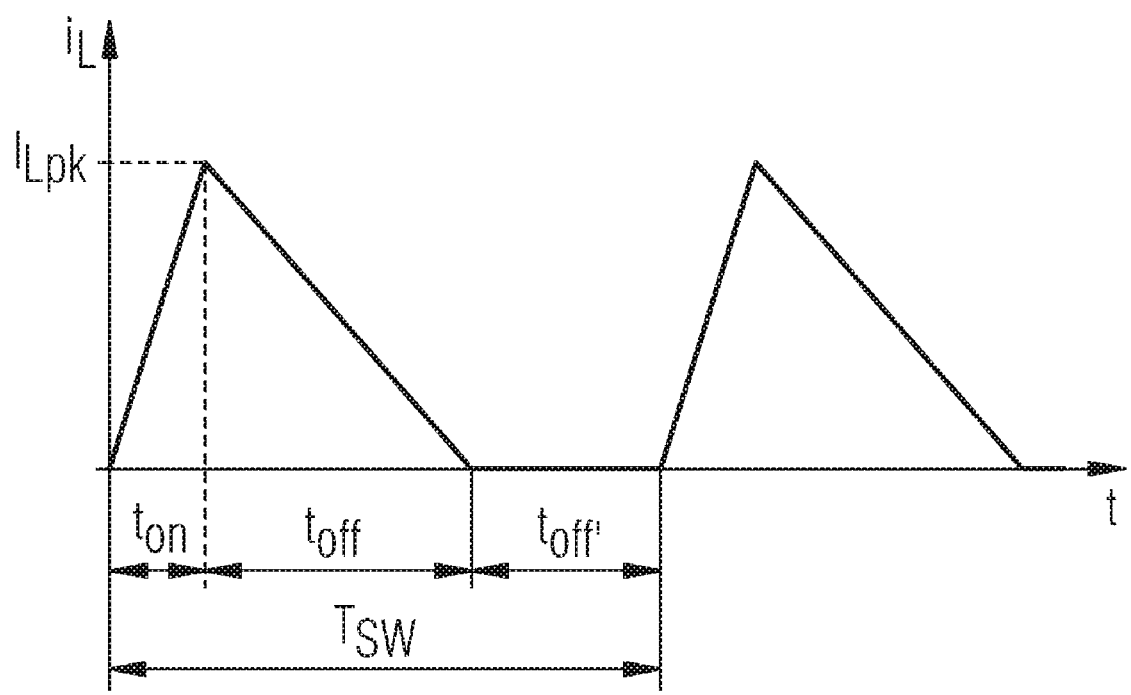
FIG. 3 is an exemplary diagram representative of the time behaviour of certain signals generated in the circuit of FIG. 2.

FIG. 3 illustrates the waveform of the current of the magnetic component in the switching-mode output stage 1 in the case of DCM operation; at low dimming levels, the switching period $T_{sw}$ is fixed by the oscillator 30 and increases for lower output power, in accordance with the electrical control signal over the line 32, while the on-time $t_{on}$ of the main switch remains constant. This function is already included in some of the existing controller on the market.

In brief, the oscillator produces a signal with a frequency regulated by the control signal on the line 32; due to the feedback arrangement overall, the frequency automatically adjusts to the correct value to obtain the required output power.

Figure 2:
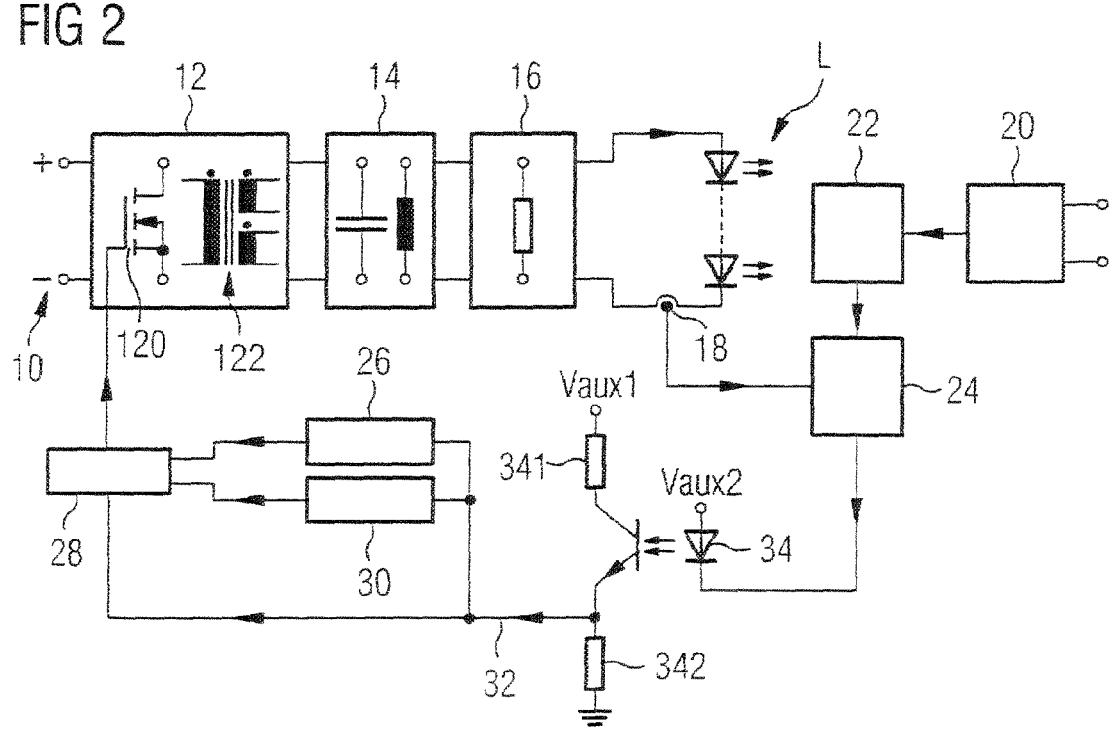
FIG. 2 is another block diagram illustrative of a particularly preferred embodiment of the invention described herein.

While in the prior art arrangement of FIG. 1 the signal from the integrating error amplifier 24 is fed directly to the CCM/DCM controller 26 and the oscillator 30, in the embodiment shown in FIG. 2, the signal output from the error amplifier 24 is fed to the CCM/DCM controller 26 and the oscillator 30 via an opto-coupler 34. In the embodiment shown, the opto-coupler 34 is fed with two supply voltages $V_{aux1}$ and $V_{aux2}$ for the receiver portion and the transmitter portion of the opto-coupler, respectively. In the example shown, the transmitter portion of the opto-coupler 34 includes a LED while the receiver portion includes a phototransistor having associated resistors 341 and 342. Specifically, the resistor 341 is connected between the voltage $V_{aux1}$ and the collector of the phototransistor, while the resistor 342 is connected between ground and the emitter of the phototransistor, from which the line 32 departs.

Even though this is not expressly shown in the drawing of FIG. 2 for the sake of simplicity, the same voltage $V_{aux1}$ also serves to supply the control circuitry comprised of the controller 26, the oscillator 30 and the logic circuitry 28.

At least in some cases, the DC-link voltage may be too high to obtain directly the low auxiliary supply voltage $V_{aux1}$ in an efficient manner. Therefore, the voltage $V_{aux1}$ can be drawn from an auxiliary winding of the same magnetic component (designated 122 in FIG. 2) of the switching-mode output stage 1.

In this case, the switching frequency cannot be too low in order to keep the control circuitry on. This implies that in this case the minimum output power delivered from the switching-mode output stage 12 is greater than zero, also at the minimum dimming level. Therefore, to reduce the current on the LED or LEDs at the minimum level, the undesired output power can be absorbed by the output bleeder 16; in order to achieve better efficiency at the rated output power, the bleeder 16 can be an active bleeder rather than a simple resistor.

In the embodiment of FIG. 2, the voltage of the control signal 32 fed towards the controller 26 and the oscillator 30 acts in a way that an increase in such voltage corresponds to a reduction of the output power. Moreover, in the same embodiment, the opto-coupler 34 is configured (i.e. arranged and biased) in such a way that the voltage of the control signal 32 fed towards the controller 26 and the oscillator 30 corresponds to the output current from the opto-coupler, so that a reduction in that current will lead to an increase in the output power.

Consequently, when the current on the opto-coupler 34 decreases (i.e. is lower) the output power increases, while, conversely, when the current on the opto-coupler 34 increases (i.e. is higher) the output power decreases.

To decrease the output power, the voltage of the control signal over the line 32 approaches a maximum voltage level, fixed by the control circuitry, used as a reference. The circuit arrangement comprised of the two resistors 341 and 342 uses this voltage reference to set the auxiliary supply voltage above the minimum value that—when the output power is reduced to the minimum dimming level—is required to maintain the control circuitry turned on; therefore, also the minimum switching frequency and, consequently, the minimum output power are indirectly fixed.

When the dimming level approaches the minimum, the opto-coupler 34 will saturate, and the auxiliary supply voltage $V_{aux1}$ will be equal to the sum of 1) the voltage of the control signal over the line 32, close to the maximum, 2) the voltage across of the opto-coupler (which is saturated), and 3) the voltage drop across the resistor 341, as determined by the current on the branch. This current is equal to the control voltage over the line 32 divided by the resistance value of the resistor 342. Thus, the minimum auxiliary supply voltage does not depend on the CTR (Current Transfer Ratio), but mainly on the maximum control voltage over the line 32, generally fixed by the control circuitry (i.e. the controller 26 and the oscillator 30 in the example shown). Of course, without prejudice to the underlying principles of the invention, the details and the embodiments may vary, even significantly, with respect to what has been described and illustrated, just by way of example, without departing from the scope of the invention as defined in the annexed claims.

The invention claimed is:

1. A LED driver arrangement including:
    a switching-mode stage (12) to produce a drive current for feeding at least one LED (L) from a DC input (10);
    a current sensor (18) sensitive to the current fed to said at least one LED (L) for producing a feedback signal indicative of the intensity of the drive current fed to said at least one LED (L);
    error amplifier circuitry (24) for comparing said feedback signal with a reference value indicative (20, 22) of a LED current as requested by a user and generating a control signal (32);
    control circuitry (26, 28, 30) sensitive to said control signal (32) to control said switching-mode stage (12) whereby the drive current fed by said switching-mode stage (12) to said at least one LED (L) corresponds to said LED current as requested by a, user, characterized in that it includes:
    an opto-coupler (34) to feed said control signal (32) to said control circuitry (26, 28, 30); said opto-coupler (34) having associated biasing circuitry (341, 342) for causing the current on said opto-coupler (34) to increase when said LED current as requested by a user decreases, said opto-coupler (34) configured to saturate when the drive current fed by said switching-mode stage (12) to said at least one LED (L) reaches a minimum level;
    an auxiliary supply voltage ($V_{aux1}$) for said control circuitry (26, 28, 30), wherein said auxiliary supply voltage ($V_{aux1}$) is kept above a minimum level by said opto-coupler (34) and the associated biasing circuitry (341, 342), when such opto-coupler (34) is saturated.

2. The driver arrangement of claim 1, characterized in that said switching-mode stage (12) includes a magnetic device (122) and said auxiliary supply voltage ($V_{aux1}$) for said controller circuitry (26, 28, 30) is provided by an auxiliary winding of said magnetic device (122).

3. The driver arrangement of either of claim 1 or 2, characterized in that said opto-coupler (34) includes an output phototransistor whose collector and emitter are connected to said auxiliary supply voltage ($V_{aux1}$) and to ground, respectively, via respective resistors (341, 342) and in that the voltage on said emitter is transmitted as said control signal (32) towards said controller circuitry (26, 28, 30).

4. The driver arrangement of claim 1, characterized in that said error amplifier circuitry (24) includes an integrating element for generating a control signal (32) representative of the integral of the difference between the intensity of the current fed to said at least one LED (L) and said LED current as requested by a user.

5. The driver arrangement of claim 1, characterized in that said switching-mode stage (12) has topology selected out of buck, boost, and buck-boost and the related insulated topologies.

6. The driver arrangement of claim 1, characterized in that it includes a bleeder (16) interposed between said switching-mode stage (12) and said at least one LED (L) fed thereby.

7. The driver arrangement of claim 1, characterized in that said current sensor (18) series connected with said at least one LED (L).

8. The driver arrangement of claim 1, characterized in that it includes a user interface (20) for permitting a user to selectively set said LED current as requested by a user.

9. The driver arrangement of claim 1, characterized in that said control circuitry includes at least one of:
    a Continuous-Conduction-Mode/Discontinuous-Conduction-Mode controller (26) for driving said switching-mode stage (12) according to said control signal (32); and
    an oscillator (30) for driving said switching-mode stage (12) according to said control signal (32).

10. The driver arrangement of claim 9, characterized in that said control circuitry includes both of said controller (26) and said oscillator (30) as well as logical circuitry (28) coupled to said controller (26) and said oscillator (30) for causing said switching-mode stage (12) to be driven, selectively, by said controller (26) or said oscillator (30) as a function of said LED current as requested by a user.

11. A method of driving a LED, the method including the steps of:
    producing, in a switching-mode operation (12), a drive current for feeding at least one LED (L) from a DC input (10);
    sensing (18) the current fed to said at least one LED (L) and producing a feedback signal indicative of the intensity of the drive current fed to said at least one LED (L);
    comparing (24) said feedback signal with a reference value indicative (20, 22) of a LED current as requested by a user and generating a control signal (32);
    controlling via control circuitry (26, 28, 30) the drive current fed to said at least one LED (L) as a function of said control signal (32) to cause the drive current fed to said at least one LED (L) to correspond to said LED current as requested by a user, characterized in that it includes the steps of:
    feeding said control signal (32) to said control circuitry (26, 28, 30) via an opto-coupler (34) having associated biasing circuitry (341, 342) for causing the current on the opto-coupler (34) to increase when said LED current as requested by a user decreases, said opto-coupler (34) configured to saturate when the drive current fed to said at least one LED (L) reaches a minimum level;
    supplying said control circuitry (26, 28, 30) by means of an auxiliary supply voltage ($V_{aux1}$) set via said optocoupler (34) and the associated biasing circuitry (341, 342), whereby said auxiliary supply voltage ($V_{aux1}$) kept above a minimum level by said opto-coupler (34) and the associated biasing circuitry (341, 342), when said opto-coupler (34) is saturated.

* * * * *